US010440639B1

(12) United States Patent
Vivanco et al.

(10) Patent No.: US 10,440,639 B1
(45) Date of Patent: Oct. 8, 2019

(54) PROACTIVE NEIGHBOR LIST OPTIMIZATION FOR AUTOMATIC NEIGHBOR RELATION IN A CELLULAR WIRELESS NETWORK

(71) Applicant: Clearwire IP Holdings LLC, Overland Park, KS (US)

(72) Inventors: Daniel Vivanco, Sterling, VA (US); Krishna Sitaram, Chantilly, VA (US); Chunmei Liu, Great Falls, VA (US); Hemanth B. Pawar, Brambleton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 1302 days.

(21) Appl. No.: 14/179,201

(22) Filed: Feb. 12, 2014

(51) Int. Cl.
*H04W 48/16* (2009.01)

(52) U.S. Cl.
CPC ................... *H04W 48/16* (2013.01)

(58) Field of Classification Search
CPC ... H04W 16/02; H04W 16/32; H04W 84/045; H04W 24/00; H04W 24/08; H04W 36/0083; H04W 88/18; H04L 5/0048
USPC .......................... 370/320, 331; 455/423, 436
See application file for complete search history.

(56) References Cited

U.S. PATENT DOCUMENTS

| 6,119,005 | A | * | 9/2000 | Smolik | ............... | H04B 7/2628 370/320 |
|---|---|---|---|---|---|---|
| 6,564,055 | B1 | | 5/2003 | Hronek | | |
| 7,826,847 | B1 | | 11/2010 | Roskowski et al. | | |
| 2005/0239466 | A1 | * | 10/2005 | Calin | .................... | H04W 36/22 455/437 |
| 2009/0052350 | A1 | * | 2/2009 | Chen | .................... | H04W 24/02 370/255 |
| 2009/0061871 | A1 | * | 3/2009 | Gross | ................ | H04W 36/0061 455/436 |
| 2011/0009135 | A1 | * | 1/2011 | Roskowski | ....... | H04W 36/0083 455/500 |

* cited by examiner

*Primary Examiner* — Natasha W Cosme (57) ABSTRACT

A method and system for proactively managing a base station neighbor list. A base station or other network node tracks changes to the base station's neighbor list and identifies a recurring pattern of changes, in correspondence with a particular time of day for instance. The base station or other node then proactively changes the base station's neighbor list in anticipation of a recurrence of the identified pattern, such as in anticipation of recurrence of the time of day for instance. Advantageously, this method can help to reduce the extent to which the base station engages in an automatic neighbor relation process, and thus reduce the extent of signaling and other issues associated with engaging in that process.

7 Claims, 5 Drawing Sheets

PROACTIVE NEIGHBOR LIST OPTIMIZATION FOR AUTOMATIC NEIGHBOR RELATION IN A CELLULAR WIRELESS NETWORK

BACKGROUND

Unless otherwise indicated herein, the materials described in this section are not prior art to the claims and are not admitted to be prior art by inclusion in this section.

A cellular wireless network may include a number of base stations that radiate to define wireless coverage areas, such as cells and cell sectors, in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or a packet-switched network such as the Internet for instance. With this arrangement, a UE within coverage of the network may engage in air interface communication with a base station and may thereby communicate via the base station with various remote network entities or with other UEs.

In an example arrangement, a base station may manage a neighbor list that includes information relating to one or more other neighboring base stations that are arranged to define one or more coverage areas neighboring a coverage area of the base station. Generally, the neighbor list includes information that identifies the neighboring base stations and connectivity information for establishing communications with the neighboring base stations.

In the example arrangement, the base station may utilize the information in the neighbor list to initiate a handover of the connectivity between the one or more UEs and the network. For instance, the one or more UEs may report a signal strength of a neighboring base station that is greater than a corresponding signal strength of the base station. In this instance, the base station may establish communication with the neighboring base station based on the information in the neighbor list to initiate the handover of the connectivity from the base station to the neighboring base station.

The neighbor list may be automatically or periodically updated based on dynamic conditions of the cellular wireless network. By way of example, the base station may perform an automatic neighbor relation (ANR) function to detect and add new neighbors to the neighbor list and to remove outdated neighbors from the neighbor list. For instance, the base station may receive reports from one or more of the UEs within wireless coverage of the base station indicating detection of one or more particular base stations by the one or more UEs. Further, the base station may determine that the one or more particular base stations are not included in the neighbor list, and may engage in signaling with the one or more UEs to obtain information relating to the particular base stations for inclusion in the neighbor list. In practice, the base station may also engage in signaling with a server in the cellular wireless network to obtain additional information relating to the particular base stations for inclusion in the neighbor list.

Changes to the neighbor list by the base station may involve the base station engaging in signaling with the one or more UEs, and the one or more UEs engaging in signaling with the particular neighboring base stations. Unfortunately, however, the associated signaling traffic may cause a lag in the handover of the connectivity from the base station to the neighboring base station. Additionally, the signaling traffic may drain power from the one or more UEs.

Overview

In some scenarios, a pattern of the changes to the neighbor list may be identified by the cellular wireless network. For instance, one or more UEs may travel repeatedly along a particular route included in the wireless coverage area of the base station and the one or more wireless coverage areas of the neighboring base stations. In this instance, reports from the one or more UEs may indicate detection of the neighboring base stations by the one or more UEs every time the one or more UEs travel along the particular route. In turn, the reports from the one or more UEs may cause the pattern of the changes to the neighbor list by the base station to occur every time the one or more UEs travel along the particular route. Thus, the repeating pattern of the changes may be identified by the cellular wireless network.

Disclosed herein is a method and corresponding system for proactively changing the neighbor list in accordance with such an identified pattern and in anticipation of a reoccurrence of the pattern. In particular, the network may determine that the pattern of the changes corresponds with a particular time of day, and may then proactively change the neighbor list at or in anticipation of the particular time of day. Alternatively, the network may detect a recent pattern of changes to the neighbor list that is similar to a portion of the identified pattern, and the network may then proactively change the neighbor list in anticipation of the reoccurrence of the pattern. Through this process, the network may reduce communication traffic that is otherwise necessitated by the ANR function, such as signaling traffic between the one or more UEs and the base station or signaling traffic between the one or more UEs and the neighboring base stations.

Thus, in one respect, disclosed is a method, which may apply in a cellular wireless communication system or in another type of communication system. The method may involve a base station providing connectivity between a network and at least one other UE within wireless 4 coverage of the base station. And the method may involve the base station maintaining a neighbor list indicating other base stations neighboring the base station. Further, the method may involve the base station receiving reports from one or more of the UEs indicating one or more particular base stations detected by the one or more UEs. The base station may make changes to the neighbor list based on the received reports as the base station receives the reports. Further, the method may also involve the base station identifying a pattern of the changes to the neighbor list. And the method may then involve the base station proactively changing the neighbor list in accordance with the pattern and in anticipation of a reoccurrence of the pattern. The proactive changing may be based on the identification of the pattern.

In another respect, disclosed is a method that may involve a server receiving from a base station various versions of the base station's neighbor list and the server identifying a pattern of the changes to the neighbor list based on the received versions of the neighbor list. Further, the method may involve the server sending a directive to the base station based on the identification of the pattern, directing the base station to replace the neighbor list with one of the previously received versions of the neighbor list, or to make appropriate changes to the neighbor list, in anticipation of a reoccurrence of the pattern.

Still further, disclosed is a system that includes a base station configured to provide connectivity between a network and one or more UEs and a server that may manage proactive changes to the base station's neighbor list in the manner noted above.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

As noted above, FIG. 1 is a block diagram of a cellular wireless communication system according to an embodiment of the present disclosure. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

Figure 1:
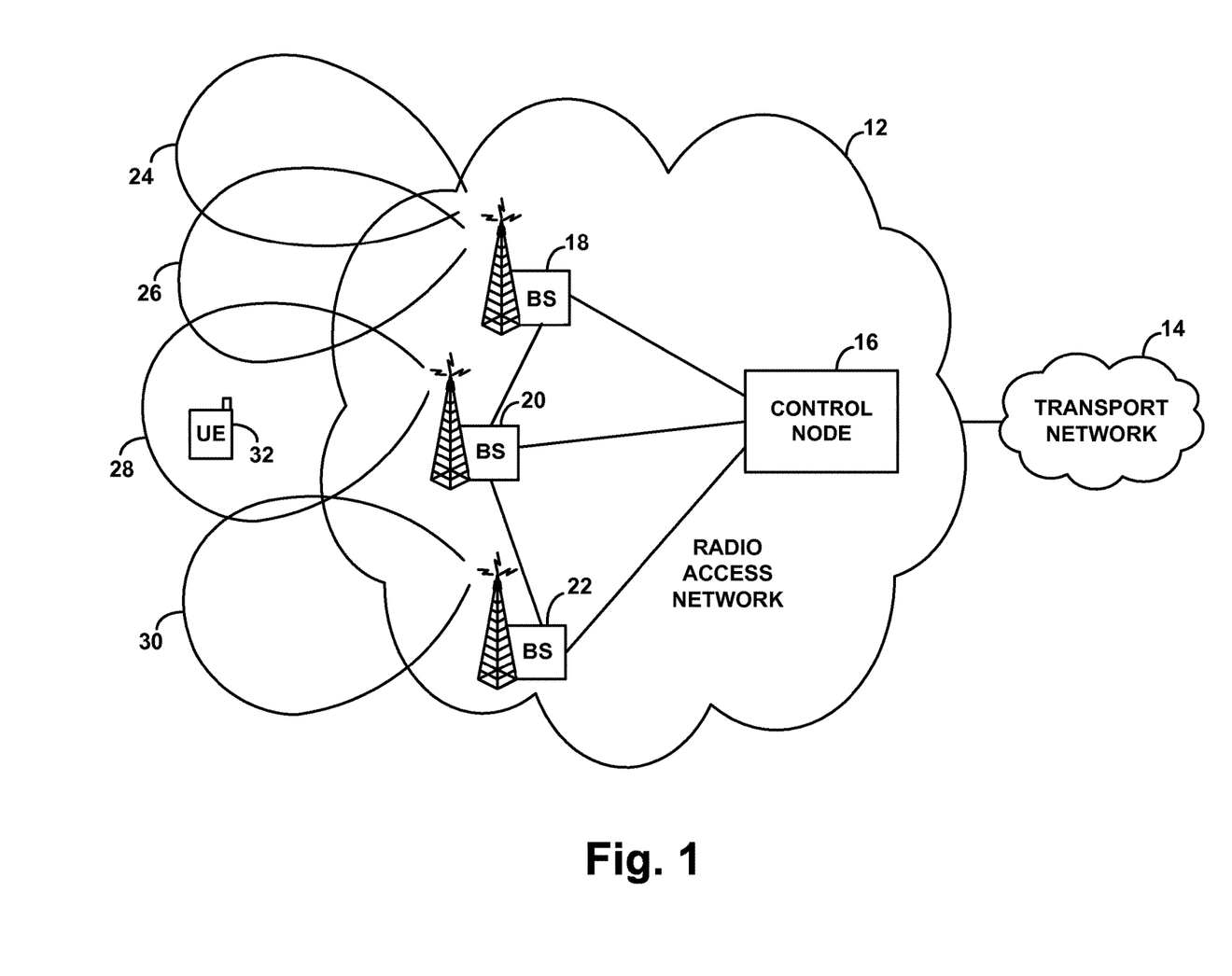
FIG. 1 is a block diagram of a cellular wireless communication system in which embodiments of the present disclosure can be implemented.

The cellular wireless system in FIG. 1 includes a radio access network (RAN) 12, which functions to provide UEs with cellular communication service, such as connectivity with a transport network 14 for instance. In general, the RAN 12 includes a control node 16 and multiple base stations (e.g., eNodeBs), three examples of which 18, 20, 22 are shown in FIG. 1. These and other components may be owned and/or operated by or for a telecommunications service provider such as a cellular wireless carrier and may physically sit as nodes on a core packet network operated by the service provider. Communications over the various illustrated interfaces may then pass between various network entities as packet-based communications, such as Internet Protocol (IP) communications for instance, through the core network.

In practice, each base station may include transceiver equipment and antennas (e.g., on an antenna tower) arranged to define one or more cellular wireless coverage areas such as a cell and cell sectors. For instance, base station 18 is shown radiating to define representative coverage areas 24, 26, base station 20 is shown radiating to define a representative coverage area 28, and base station 22 is shown radiating to define a representative coverage area 30. Shown operating within coverage area 28 is then a representative UE 32, which can be any type of wireless communication device capable of engaging in air interface communication with the base stations. The base stations and the UE 32 may be configured to communicate with each other according to any of a variety of air interface protocols, examples of which include Orthogonal Frequency Division Multiple Access (OFDMA) (e.g., Long Term Evolution (LTE) or Wireless Interoperability for Microwave Access (WiMAX)), Code Division Multiple Access (CDMA), Global System for Mobile Communications (GSM), and others now known or later developed.

Control node 16 may function to manage certain aspects of the RAN operation, such as certain base station functions and features of air interface communication. As such, the control node can take various forms, depending on the type of RAN at issue. For instance, in an LTE network, the control node can be a mobility management entity (MME), whereas in a CDMA network, the control node could be a mobile switching center (MSC). Other examples are possible as well.

In line with the discussion above, each base station in a RAN such as that shown in FIG. 1 may maintain a neighbor list that lists neighboring base stations. Optimally, the neighbor list would identify each neighboring base station in a manner that allows communication with the neighboring base station, such as over an inter-base station interface (e.g., X2 interface). For instance, in an arrangement where the base stations sit as nodes on an IP network, the neighbor list may specify for each neighboring base station an IP address of the base station.

Through an Automatic Neighbor Relations (ANR) process as discussed above, a base station may build up its neighbor list and revise its neighbor list over time based on reports from served UEs.

For instance, when a UE served by a base station reports to the base station that the UE detected a neighboring base station, the UE may report a non-unique identifier associated with the neighboring base station, with that non-unique identifier having been readily detected and perhaps decoded by the UE based on a pilot or reference signal from the neighboring base station. If the serving base station does not have that particular neighboring base station included in its neighbor list, the serving base station may then request the UE to provide unique identifying information for the detected neighboring base station, the UE may engage in signaling with the neighboring base station to obtain that information and report it to the serving base station, and the serving base station may use that information as a basis to determine information about the neighboring base station, such as an IP address of the neighboring base station. Then the serving base station may then advantageously add the neighboring base station to its neighbor list. Advantageously, the serving base station may then make use of the neighbor list with that added information, to facilitate communication with that neighbor and for other purposes, without the need to request other UEs to provide unique identifying information for the base station.

Further, a serving base station may impose a limit on the length of its neighbor list, such as a maximum number of neighboring base stations to include in the list. With such a limit in place, if the list reaches the limit, the base station may be set to remove from the list an oldest entry (one added the longest time ago) when adding a new entry. Further, the base station may be set to automatically remove from its neighbor list any neighbor as to which the base station has not received a reporting indicating UE detection of the neighbor within some predefined threshold duration of time, similarly to help manage content of the neighbor list.

Considering the arrangement of FIG. 1 by way of example, if UE 32 is served in coverage area 28 by base station 20 and the UE begins to move into coverage area 30 of base station 22, the UE may detect a signal from base station 22 and may send to serving base station 20 a report indicating detection of base station 22. The UE may provide this report for various reasons, such as in response to having detected threshold poor signal strength from serving base station 20 and threshold high signal strength from base station 22, or as a periodic measurement report.

Upon receipt of this report from UE 32, base station 20 may then determine whether the reported base station 22 is in the neighbor list of base station 20. If base station 20 thereby determines that base station 22 is not include in its neighbor list, then base station 20 may engage in an ANR process to update its neighbor list. In particular, base station 20 may engage in signaling with the UE 32 to request information relating to the base station 22 for inclusion in the neighbor list, and the UE may thus engage in signaling with base station 22 to obtain the requested information (e.g., receiving broadcast information from base station 22) and may engage in further signaling with base station 20 to report the requested information. Further, base station 20 may engage in signaling with control node 16 to obtain additional information, such as an IP address of the reported neighboring base station. And base station 20 may update its neighbor list to add an entry for base station 22. Assuming the neighbor list was already at its maximum size, base station 20 may thus also remove from the neighbor list an older entry to make room for the new entry.

In addition, as a base station such as base station 20 makes changes to its neighbor list, the base station may also report the changes to control node 16, and control node may keep a record of the latest neighbor list. In certain RAN implementations, maintaining a copy of a base station's neighbor list at the control node may enable the control node to facilitate communication between base stations. For instance, the control node may use the neighbor list to facilitate routing of messages between base stations, or for other purposes.

In the event the report from the UE was appropriate to trigger handover of the UE from being served by base station 20 to being served by base station 22, base station 20 may also engage in a process to facilitate that handover. For instance, base station 20 may transmit a handover request message to the IP address of base station 22 indicated by the neighbor list, base station 22 may reserve resources to serve the UE and inform base station 20 that handover is ready, and base station 20 may then signal to the UE to direct the UE to transition to be served by base station 22.

In practice, a base station's neighbor list may experience certain repeating patterns of changes over time. A good example of this may occur in a scenario where a given base station provides a coverage area along a road and where there are possibly numerous other base stations, such as small cells or the like, along the road, a first group of base stations in one direction along the road from the given base station, and a second group of base stations in the opposite direction along the road from the given base station.

In that scenario, during every morning commute in one direction along the road, the given base station may receive reports of served UEs detecting base stations of the first group, and the given base station may engage in the ANR process to add the base stations of that first group to its neighbor list. Yet during every evening commute in the other direction along the road, the given base station may instead receive reports of served UEs detecting base stations of the second group, and the given base station may engage in the ANR process to add the base stations of that second group to its neighbor list. Furthermore, each time the given base station adds base stations of the first group to the neighbor list, the given base station may delete base stations of the second group from the neighbor list. And each time the given base station adds base stations of the second group to the neighbor list, the given base station may delete base stations of the first group from the neighbor list.

Each time such a pattern of changes to a base station's neighbor list recurs, the base station would go through the ANR process to make the changes to the neighbor list. Thus, the base station would engage in signaling with UEs to receive information about neighboring base stations, UEs would thus engage in signaling to obtain and report information to facilitate the ANR process. And further, the base station may engage in signaling with a control node or other network entities.

The present method may advantageously help to reduce a repeated application of the ANR process like this, by identifying a recurring pattern of changes to a base station's neighbor list and then proactively applying changes in accordance with the identified pattern. More particularly, the method may involve evaluating changes that have occurred to a base station's neighbor list over time and thereby identifying that a particular change or set of changes to the neighbor list tends to occur repeatedly at a particular time of day (e.g., time range of day) or the like, and then proactively making that particular change or set of changes in anticipation of the occurrence of that time of day, such as just before that time of day for instance.

In the example above, this may involve evaluating changes that were made to the given base station's neighbor list over time and thereby determining that (i) between 7:00 a.m. and 8:00 a.m. each weekday, base stations of the first group tend to get added to the given base station's neighbor list, and the base stations of the second group tend to get removed from the given base station's neighbor list, and (ii) between 5:00 p.m. and 6:00 p.m. each weekday, the base stations of the second group tend to get added to the given base station's neighbor list, and the base stations of the first group tend to get removed from the given base station's neighbor list. In response to detecting these patterns of changes, the method may then involve proactively implementing the changes of the patterns in accordance with the times when the patterns were deemed to recur. For instance, the method may involve automatically changing the given base station's neighbor list at 6:00 a.m. each weekday to add the base stations of the first group and remove the base stations of the second group, and automatically changing the given base station's neighbor list at 4:00 p.m. each weekday to add the base stations of the second group and remove the base stations of the first group.

In practice, a proactive change to a base station's neighbor list in accordance with the present disclosure can be made by changing, adding, and/or removing various entries in the neighbor list. Alternatively, the method could involve storing time-dependent versions of the base station's neighbor list, and then readily selecting one of the neighbor lists to be the active neighbor list at a given time. For instance, in the example above, the method may involve storing a first version of the neighbor list that includes base stations of the first group but excludes base stations of the second group, and storing a second version of the neighbor list that includes base stations of the second group but excludes base stations of the first group, and setting the first version to be the active neighbor list starting at 6:00 a.m. each weekday and the second version to be the active neighbor list starting at 4:00 p.m. each weekday.

By proactively changing a base station's neighbor list in accordance with a determination that certain changes are likely to recur, the present method may help to reduce instances of the ANR process, and may thus help to reduce signaling associated with the ANR process and alleviate various other disadvantages associated with the ANR process.

Further, the method can be enhanced to help keep proactively implemented versions of a base station's neighbor lists in place and to perhaps further reduce instances of ANR. In practice, for instance, the method may further involve determining that a base station's neighbor list tends to be largely static in a particular time of day range, in that the list tends to not change very much in that time range, and responsively preventing implementation of the ANR process by the base station during that time range.

For example, continuing with the example above, the method may involve determining that the given base station's neighbor list tends to change to the first version between 7:00 a.m. and 8:30 a.m. and remain largely unchanged until 9:00 a.m. Although there might be some aberrations such as UEs reporting different base stations from time to time, an analysis of changes to the given base station's neighbor list may show that those changes are just aberrations and are not typically recurring. Thus, from 8:30 a.m. to 9:00 each weekday, the neighbor list could be deemed quasi-static or quasi-stationary, in that it really tends to be the first version of the list for the most part in that time range. In response to detecting such a scenario, the method may then involve preventing application of the ANR process during that time range, so as to avoid making changes that would be mere aberrations or the like for instance.

Still further, the method can be enhanced by proactively implementing changes to a neighbor list not just in anticipation of the occurrence of a particular time of day at which the changes tend to occur, but perhaps in response to occurrence of a portion of the changes. For instance, in the example above, if there are eight base stations A, B, C, D, E, F, G, H in the first group, it may be the case that those eight base stations tend to get added to the given base station's neighbor list in the order A, B, C, D, E, F, G, H. Given a determination that those base stations tend to get added to the given base station's neighbor list in that order, the method could involve detecting that base stations A, B, C, and D have been added to the given base station's neighbor list in that order, and deeming that to be the beginning of a recurrence of the trend of adding the eight base stations. Consequently, in response to detecting that portion of changes of the identified pattern of changes, the method may involve then automatically adding base stations E, F, G, and H to the given base station's neighbor list as well, on grounds that those base stations would likely be added next anyway. Advantageously, this may then help avoid the need to engage in the ANR process with respect to those additions. Furthermore, this could also be done in response to this portion of changes occurring at a particular time of day when identified pattern tends to occur.

Yet further, the method can also be enhanced by proactively implementing changes to one base station's neighbor list based on a determination that another base station's neighbor list tends to experience particular changes at a particular time of day or the like. For instance, as a variation on the example above, consider a scenario where a first macro base station A is positioned along a north-south road, a second macro base station B is positioned slightly north of the first base station also along the road, and a number of small cell base stations C, D, E, F, G are positioned along the road within coverage of the first base station A and the second base station B.

In that scenario, given a determination that base stations C, D, E, F, and G tend to get added to the neighbor list of base station A in the morning hours and tend to get removed from the neighbor list of base station A in the evening hours, a reasonable conclusion may be that similar changes may occur to the neighbor list of base station B. Consequently, in response to identifying such a time-dependent pattern of changes to the neighbor list of base station A, the method may involve proactively changing the neighbor list of base station B in a similar manner in anticipation of the same or similar time of day. Alternatively or additionally, the method may involve detecting the occurrence of at least some of those changes to the neighbor list of base station A and responsively making the same or similar changes to the neighbor list of base station B.

Figure 2:
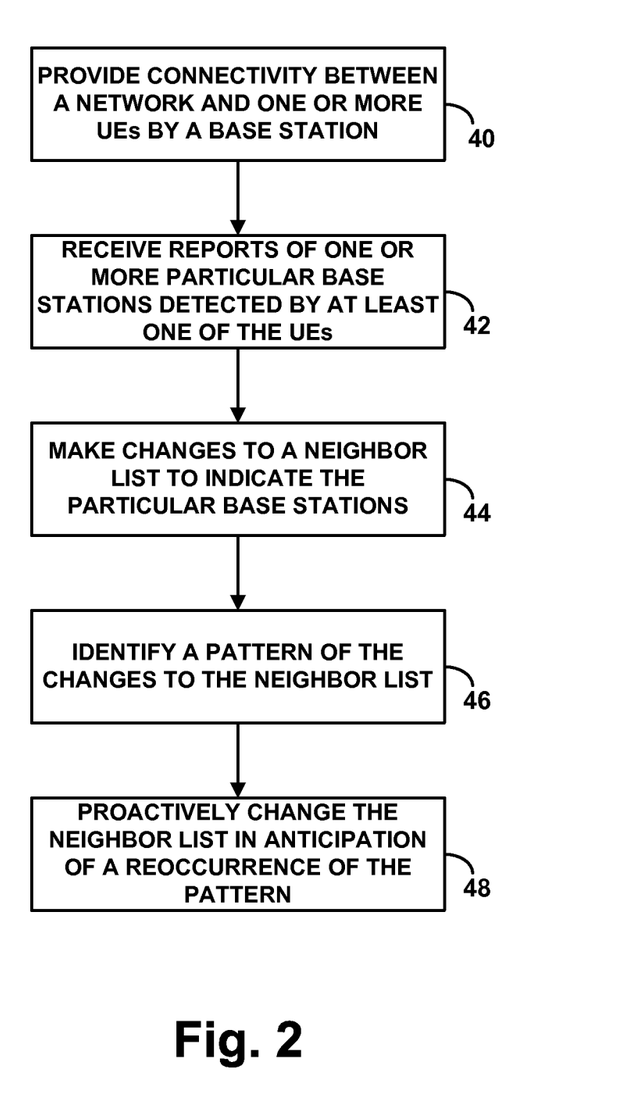
FIG. 2 is a flow chart depicting functions that can be carried out in accordance with the disclosure.

FIG. 2 is a flow chart depicting example functions of a method that can be carried out in accordance with the present disclosure. The functions of this method may be carried out by one or more entities, such as the base station 20 possibly in cooperation with the control node 16 and/or another server but are described here as being carried out by a base station. Further, although this flow chart depicts the functions in a particular sequence, note that various depicted functions may occur concurrently with each other or perhaps in an order different from that shown.

As shown in FIG. 2, at block 40, a base station provides connectivity between a network and at least one UE. For instance, in the arrangement of FIG. 1, base station 20 may provide UE 32 with connectivity to allow UE 32 to communicate on transport network 14. In line with the discussion above, such a base station may maintain a neighbor list that indicates various neighboring base stations. For instance, base station 20 may maintain in data storage a neighbor list that, from time to time, lists neighboring base stations such as base station 18 and base station 22.

At block 42, the base station receives from one or more of the at least one UE reports of one or more particular base stations detected by the one or more UEs. For instance, as UEs move along a road in the example above, the UEs may transmit reports to their serving base station as discussed above, indicating detection of various neighboring base stations. And as an example in the context of FIG. 1, if UE 32 is served by base station 20 and moves into coverage area 30 provided by base station 22, UE 32 may detect that coverage and transmit to serving base station 20 a report indicating that the UE detected base station 22.

At block 44, the base station makes changes to its neighbor list based on the received reports, as the base station receives the reports. For instance, in line with the discussion above, each time the base station receives a report of a detected neighboring base station, the base station may determine if the detected base station is already listed in its neighbor list, and if it is not, the base station may then engage in an ANR process to obtain information about the detected base station and to add the detected base station to its neighbor list. Further, if a limit exists on the number of entries allowed in the neighbor list, the base station may remove an older entry when adding a new entry.

At block 46, the base station identifies a pattern of changes (one or more changes) to its neighbor list. To facilitate this, the base station may maintain records of changes that it makes to its neighbor list over time and/or may maintain different versions of its neighbor list resulting from changes from time to time, correlating each change and/or each version with a particular time of day for instance. The base station may then programmatically evaluate the history of changes to the neighbor list to determine that one or more particular changes tends to occur at a particular time of day (e.g., a time of day range, day of week, or the like), or that a particular version of the neighbor list tends to be in effect at a particular time of day. In practice, such a pattern may arise as a result of UEs tending to move along similar routes regularly at the same time each day, but the pattern could just as well arise from other circumstances.

Optimally, the base station may evaluate a rate of changes to its neighbor list as a basis to determine when the identify a pattern of changes to the neighbor list. For instance, the base station may keep track of how often changes occur to its neighbor list and may carry out the function of evaluating the changes and identifying a pattern of changes in response to determining that the rate of changes is greater than a predefined threshold rate. Thus, in the example above, if the neighbor list tends to change a lot during morning and evening commute hours, the base station may responsively seek to identify patterns of changes corresponding with those hours. Whereas, if the neighbor list tends to remain fairly unchanged during mid-day hours, the base station might not seek to identify patterns of changes corresponding with those hours.

At block 48, based on the identification of the pattern, the base station proactively changing its neighbor list in accordance with the pattern and in anticipation of reoccurrence of the pattern. In practice, for instance, once the base station identifies a pattern of changes to its neighbor list, such as one or more particular changes that tend to occur at a particular time of day, the base station may programmatically set itself to automatically apply such a pattern of changes in anticipation of that time of day, such as shortly before or at the occurrence of that time of day. Thus, when the appropriate time comes in advance of or at the time of day that the base station has correlated with that pattern of changes, the base station may automatically apply the pattern of changes. Advantageously, by proactively changing the neighbor list in this manner, the base station can help avoid the need to engage in the ANR process at every instance of the time of day, and can thus help avoid signaling and other issues associated with the ANR process.

In line with the discussion above, the method may further involve the base station detecting a correlation between a recent pattern of changes to the neighbor list and at least one portion of the identified pattern of changes, and the base station may carry out the proactive changing of the neighbor list in response to detecting that correlation. For instance, assuming the base station has identified a particular pattern of changes that tends to occur to its neighbor list, the base station may detect that the first portion of that particular pattern has just occurred, and the base station may responsively then automatically make the remaining changes of the particular pattern, to help avoid the need to engage in the ANR process with respect to those additional changes.

Further, also in line with the discussion above, the method may involve the base station determining that a rate of changes to the neighbor list is less than a predefined threshold rate at a particular time of day. Responsive to determining that the rate of change is less than that threshold rate and to having made a proactive change to the neighbor list in view of an identified pattern of changes, the base station may then prevent changes to the neighbor list for a given period of time that corresponds to a period of time when the identified pattern occurred. In this way, the base station may help to avoid application of the ANR process for mere aberrations as discussed above.

Moreover, also in line with the discussion above, the method may involve proactively changing the neighbor list of another base station based on having identified a pattern of changes to a particular base station's neighbor list. Optimally, this function may be carried out by a network entity that is in communication with both base stations, such as control node 16 or another server for instance. Alternatively, this function could be carried out through inter-base station communication, with one base station instructing the other base station to make certain neighbor list changes. Further, the corresponding changes that would be made to the other base station's neighbor list could be the same changes of the identified pattern of changes made to the particular base station's neighbor list, or could be different changes. Thus, in practice, the method may be considered to involve detecting a correlation between occurrence of the identified pattern and occurrence of a subsequent pattern of changes to another neighbor list associated with another base station, and then, responsive to the detecting of the correlation and the proactive changing of the neighbor list, changing the other neighbor list in accordance with the correlation.

In line with the discussion above, the method may also involve the base station initiating handover of the connectivity between the network and a given one of the one or more UEs. In particular, assuming conditions are sufficient to justify handover, the base station may engage in signaling with one of the neighboring base stations to facilitate handover of the UE from the base station to that neighboring base station. In doing so, the base station may make use of information that a current version of the neighbor list provides regarding the neighboring base station, such as an IP address to facilitate inter-base station handover signaling for instance.

Figure 3:
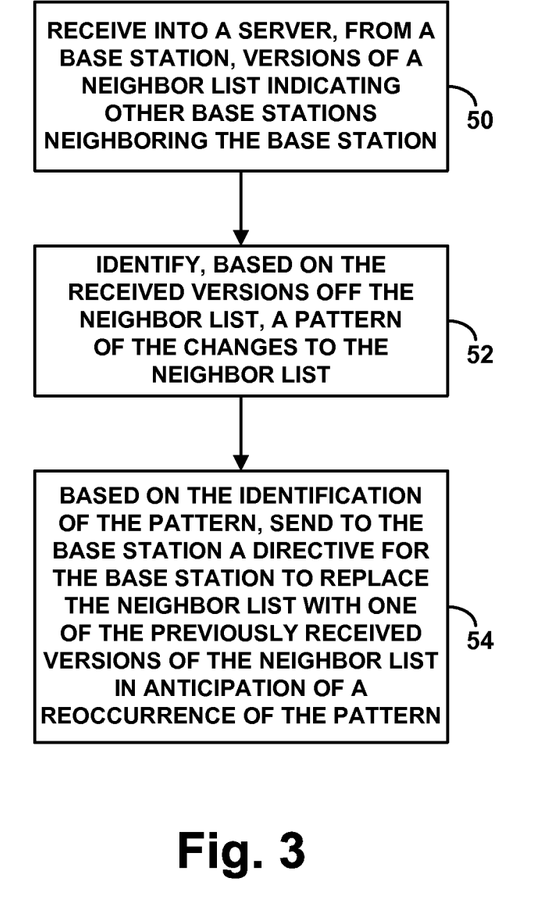
FIG. 3 is another flow chart depicting functions that can be carried out in accordance with the disclosure.

FIG. 3 is next another flow chart depicting example functions that can be carried out in accordance with the present disclosure by a server, such a control node 16 or another server (e.g., a self-organizing-network (SON) server (not shown)), to help manage proactive application of neighbor list changes. As with the functions of FIG. 2, certain functions of FIG. 3 may be carried out concurrently with each other or in another order.

As shown in FIG. 3, at block 50, the method involves the server receiving, from a base station configured to provide connectivity between a network and one or more UEs within wireless coverage of the base station, versions of a neighbor list indicating other base stations neighboring the base station. In practice, for instance, the base station may be configured to make changes to its neighbor list in line with the discussion above as the base station receives reports from at least one of the UEs indicating detection of one or more particular base stations by the at least one UE. And the base station may configured to regularly report such changes to the server and/or to engage in signaling with the server that otherwise informs the server of the changes in correspondence with time of day. Thus, the server may receive such reports from the base station and may keep records of those reports, and thus of the changes to the base station's neighbor list over time. These reports may indicate "versions" of the neighbor list by providing full versions or by reporting changes that effectively define new versions that would result from application of the reported changes to previous versions.

At block 52, the method then involves the server identifying, based on the received versions of the neighbor list, a pattern of the changes to the neighbor list. This function may be largely the same as that discussed above, involving programmatically evaluation of changes to the neighbor list over time and identifying a pattern of changes that tends to occur repeatedly, possibly correlated with time of day or the like.

And at block 54, the method involves, based on the identification of the pattern, the server sending to the base station a directive for the base station to replace the neighbor list with one of the previously received versions of the neighbor list in anticipation of a reoccurrence of the pattern. For instance, the server may transmit to the base station a replacement version of the neighbor list with a directive for the base station to put the replacement version into effect in place of a version of the neighbor list that the base station had in effect, and/or the server may transmit to the base station a specification of one or more changes to make to the base station's current neighbor list so as to put the replacement version in effect. Further, in line with the discussion above, for instance, this could be done in anticipation of the time of day when the pattern was determined to occur repeatedly, and/or this could occur in response to detecting that a recent pattern of changes to the neighbor list (e.g., a just occurred and just reported set of changes to the neighbor list) corresponds with at least a portion of the identified pattern, and responsively directing the base station to make additional changes in accordance with the pattern.

Still further, this method can involve various other functions as described above. For example, the server could receive from the base station a trigger indicating that a rate of changes to the neighbor list is greater than a predefined threshold rate, and the server could identify the pattern in response to receiving that trigger. Receiving the trigger could itself take various forms. For instance, this function may involve receiving a specific message from the base station specifying or otherwise indicating that the rate is threshold high, or this function may involve receiving reports of changes at a threshold rate or reports that show changes having occurred at a threshold high rate. Other examples are possible as well.

As another example, the server may determine that the rate of changes in the pattern is less than a predefined threshold rate and may responsively send to the base station another directive that causes the base station to prevent changes to the neighbor list for a given period of time that corresponds to a period of time when the identified pattern occurred, i.e., when the identified pattern was determined to repeatedly occur. And as still another example, the server may detect a correlation between occurrence of the identified pattern and occurrence of a subsequent pattern of changes to another neighbor list associated with another base station, and, responsive to detecting the correlation, the server may send to the other base station a directive that causes the other base station to change the other neighbor list in accordance with the correlation. These and other directives may take the form of messages configured in a way that the recipient base station is programmed to interpret to cause the recipient base station to take the intended action.

Yet further, in this method as well, the base station may also initiate handover of connectivity between the network and a given one of the one or more UEs, to transition the UE to be served by a neighboring base station, again optimally making use of information in the neighbor list regarding the neighboring base station.

Figure 4:
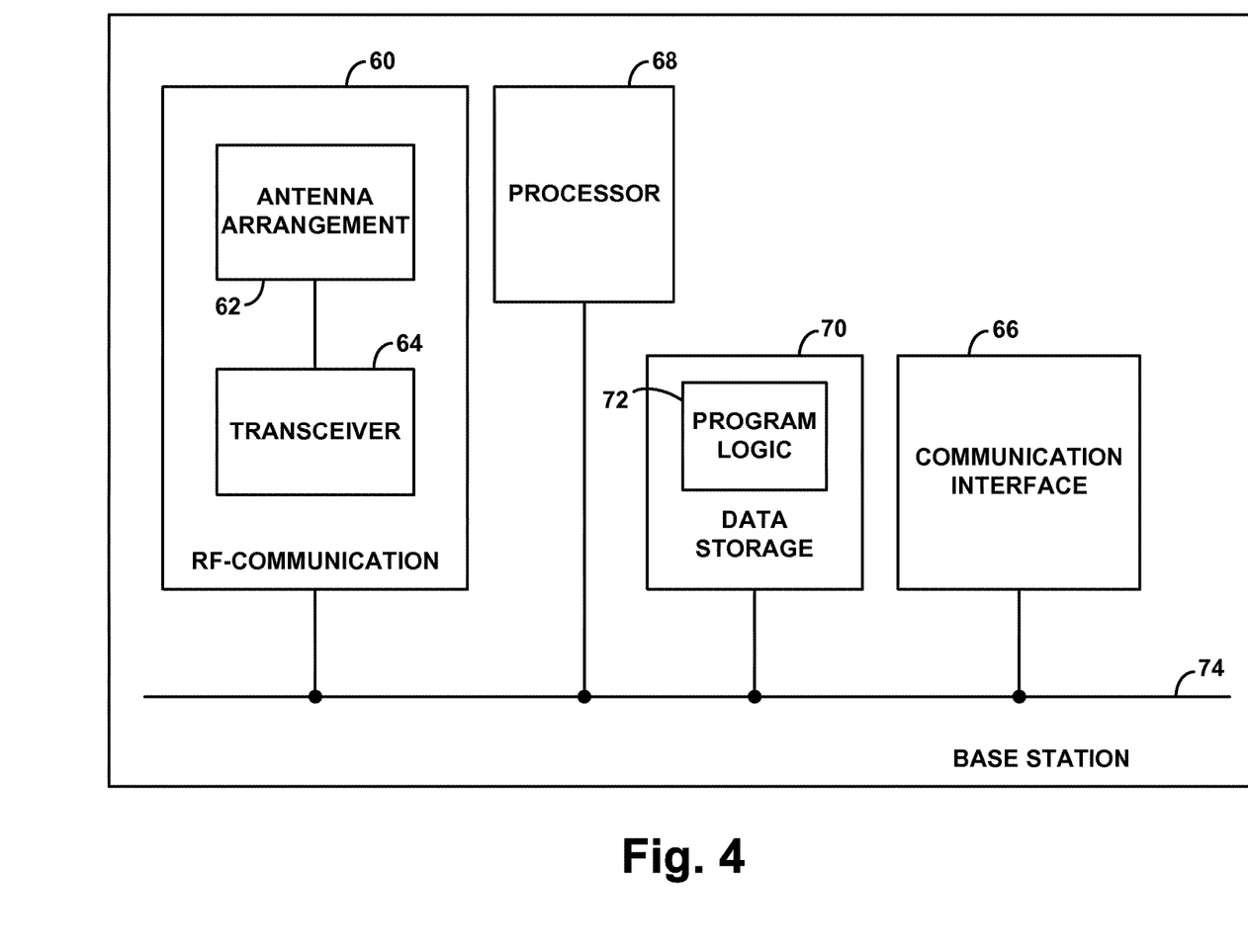
FIG. 4 is a block diagram of an example base station operable within the system of FIG. 1.

FIG. 4 is a block diagram of an example base station operable within the system of FIG. 1. As shown, the base station includes for each of its one or more coverage areas a radio frequency (RF) communication block 60 that includes a respective antenna arrangement 62 and transceiver 64, a communication interface 66, a processor 68, and non-transitory data storage 70, all of which may be communicatively linked together by a system bus, network, or other connection mechanism 74.

The antenna arrangement 62 may include one or more antennas arranged in a manner now known or later developed for radiating to define a wireless coverage area. The antenna arrangement would be mounted at the top of an antenna tower or could be provided in some other manner, such as in a femtocell arrangement for instance. The transceiver 64, in turn, may comprise a power amplifier, a modem chipset, channel cards, and other circuitry for sending and receiving communications via the antenna arrangement 62 in accordance with an agreed air interface protocol.

The communication interface 66 may comprise a mechanism for communicatively linking the base station with the control node 16 or with one or more other base stations, such as to facilitate communication of control signaling between the base station and the control node, or signaling between the base station and the other base stations. For instance, under the LTE protocol, communication interface may facilitate signaling with the control node 16 over an Si interface and/or with other base stations over an X2 interface. As such, the communication interface may be an Ethernet interface or the like, facilitating packet-switched network communications.

The processor 68 may include one or more general purposes processors and/or one or more special purpose processors (e.g., dedicated digital signal processors or application specific integrated circuits) and may be integrated in whole or in part with the transceiver 64 or with other aspects of the base station. And the data storage 70 may include one or more volatile and/or non-volatile storage components, such as magnetic, optical, or flash storage components, which can be integrated in whole or in part with the processor 68. In practice, the data storage 70 may hold a neighbor list that includes information relating to other base stations neighboring the base station. For instance, the neighbor list associated with the base station 20 may include information relating to the base stations 18 and 22. As shown, the data storage 70 may contain program logic 72 that can be executed by the processor 68 to carry out various base station functions described herein, such as the functions described above with respect to FIG. 2. FIG. 4 is a block diagram of an example control node or other server operable within the system of FIG. 1. As shown, the control node may include a processor 80, a non-transitory data storage 82, and a communication interface 86, all of which may be communicatively linked together by a system bus, network, or other connection mechanism 88.

Figure 5:
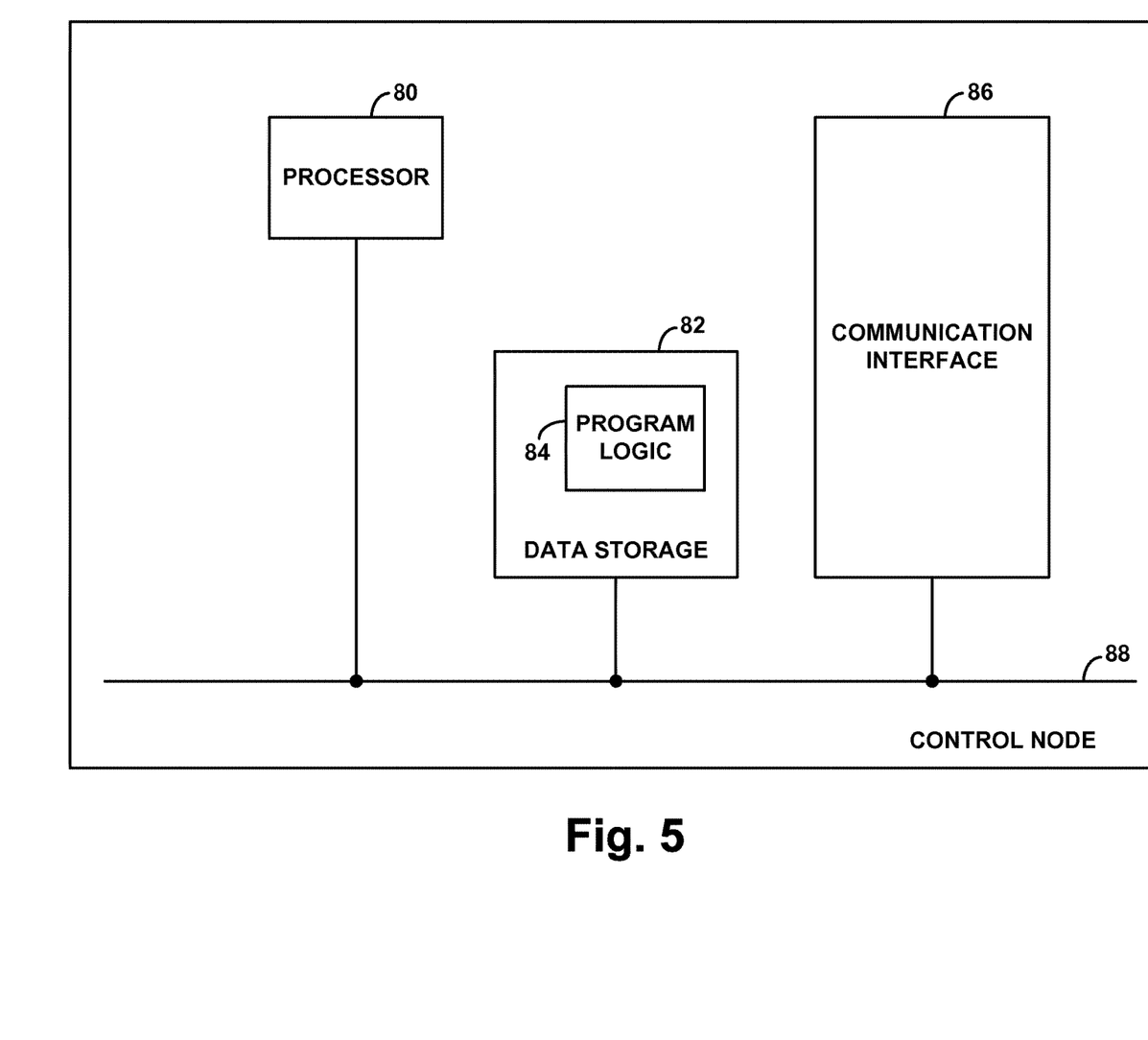
FIG. 5 is a block diagram of an example control node operable within the system of FIG. 1.

As with the base station processor 68, the control node processor 80 may include one or more general purposes processors and/or one or more special purpose processors. And the data storage 82 may include one or more volatile and/or non-volatile storage components, such as magnetic, optical, or organic storage components, and can be integrated in whole or in part with the processor 80. Further, the data storage 82 may contain program logic 84 that can be executed by the processor 80 to carry out various control node functions described herein. And the communication interface 86 may function to facilitate connectivity with various other network entities such as with one or more base stations.

Exemplary embodiments have been described above. Those skilled in the art will understand, however, that changes and modifications may be made to these embodiments without departing from the true scope and spirit of the invention.

We claim:

1. A method comprising:
    providing, by a base station, connectivity between a network and at least one user equipment device (UE) within wireless coverage of the base station;
    maintaining, by the base station, a neighbor list indicating other base stations neighboring the base station;
    receiving, by the base station from one or more of the at least one UE, reports of one or more particular base stations detected by the one or more UEs, and making changes to the neighbor list based on the received reports, by the base station, as the base station receives the reports;
    identifying, by the base station, a pattern of the changes to the neighbor list; and
    based on the identification of the pattern, proactively changing the neighbor list, by the base station, in accordance with the pattern and in anticipation of a reoccurrence of the pattern.

2. The method of claim 1, further comprising:
    initiating, by the base station, a handover of a given one of the one or more UEs from the base station to one of the other base stations indicated in a current version of the neighbor list.

3. The method of claim 1, further comprising:
    detecting, by the base station, a correlation between a recent pattern of changes to the neighbor list and at least a portion of the identified pattern, wherein the proactive changing of the neighbor list is in response to the detecting of the correlation.

4. The method of claim 1, wherein the identified pattern corresponds with a particular time of day, and wherein the proactive changing of the neighbor list is in anticipation of the particular time of day.

5. The method of claim 1, wherein the identifying of the pattern is in response to a rate of the changes to the neighbor list being greater than a threshold rate.

6. The method of claim 1, further comprising:
    determining that a rate of the changes to the neighbor list is less than a threshold rate; and
    responsive to the determining that the rate is less than the threshold rate and the proactive changing of the neighbor list, preventing changes to the neighbor list by the base station for a given period of time that corresponds to a period of time when the identified pattern occurred.

7. The method of claim 1, further comprising:
    detecting a correlation between occurrence of the identified pattern and occurrence of a subsequent pattern of changes to another neighbor list associated with another base station; and
    responsive to the detecting of the correlation and the proactive changing of the neighbor list, changing the other neighbor list in accordance with the correlation.

* * * * *